Patented Jan. 18, 1949

2,459,760

UNITED STATES PATENT OFFICE 2,459,760

MANUFACTURE OF 2,3-DICHLORO-BUTADIENE-1,3

Robert T. O'Donnell, Montclair, N. J., assignor to The Firestone Tire & Rubber Company, Akron, Ohio, a corporation of Ohio No Drawing. Application October 17, 1946, Serial No. 703,713

3 Claims. (Cl. 202—57)

This invention relates to the manufacture of 2,3-dichlorobutadiene-1,3, hereinafter designated, for brevity, "dichlorobutadiene."

The manufacture and purification of dichlorobutadiene is greatly complicated by the tendency of this compound to spontaneously polymerize and form hard, thick and tightly adherent deposits upon the surfaces of the apparatus employed. Such deposits soon bring the entire process to a standstill, due to obstruction of the flow of materials, interference with heat transfer, etc. The hard and tightly adherent nature of the deposit render clean-up operations exceedingly difficult.

Accordingly, it is an object of this invention to retard the polymerization of dichlorobutadiene upon the surfaces of apparatus employed in the manufacture thereof.

Another object is to provide for the easy removal of such deposits of dichlorobutadiene as may form in the apparatus.

The above and other objects are secured, in accordance with this invention, by coating, with sodium silicate compositions, the metallic or other surfaces of apparatus employed in the manufacture and processing of dichlorobutadiene. Dichlorobutadiene polymerizes relatively slowly upon surfaces so treated, and any deposits eventually formed are readily scaled off. Scaling operations may be facilitated by softening the silicate coating with water, and in some cases the deposits may be completely removed by simple washing. The original application of the sodium silicate to the apparatus may be effected in any convenient manner, for instance by brush- or spray-coating of the surfaces with an aqueous solution of the sodium silicate.

Referring to the sodium silicates employed as polymerization inhibiting coatings in accordance with this invention, these may be any sodium silicates which are sufficiently soluble in water for purposes of application to the surfaces of the apparatus to be treated, and having sufficient film strength under operating conditions to withstand the abrasive action of the materials processed—e. g., any silicate compositions customarily employed for coating purposes. In contrast to the usual silicate coatings, the coating compositions employed in this invention need not be particularly resistant to water, when finally applied, and are preferably somewhat weakly resistant in this particular, to facilitate clean-up operations. In general, the preferred materials will have a Na$_2$O:SiO$_2$ ratio of from about 1:2.2 to about 1:3.9, the higher ratios of Na$_2$O being preferred as exerting a more effective anti-polymerization effect and as being more readily broken down by water during the ultimate clean-up operation.

There are numerous locations in the various types of apparatus employed in the manufacture of dichlorobutadiene, which may be advantageously coated with the polymerization inhibiting materials of this invention. Usually this apparatus will be constructed of steel or other metals resistant to corrosion by dichlorobutadiene or impurities associated therewith. For instance, one method of manufacturing dichlorobutadiene involves the caustic dehydrohalogenation of 1,2,2,4-tetrachlorobutane, preferably in methanolic solution, and simultaneous distillation of the resultant dichlorobutadiene-methanol azeotrope through a reflux column above the vessel in which the dehydrohalogenation is effected. The interior surfaces of the dehydrohalogenation vessel and of the reflux column may be coated with sodium silicate in accordance with this invention, and when so coated, will accumulate a crust of dichlorobutadiene polymer far less rapidly than would otherwise be the case. Likewise, after the surfaces do eventually become fouled, the apparatus may be quite readily cleaned by scraping, preferably with application of water to soften the silicate coating. It is understood that other apparatus used in the manufacture and handling of dichlorobutadiene, such, for instance, as direct chlorination and thermal dehydrochlorination equipment, stills, conduits, storage tanks and the like may also be coated with sodium silicate in accordance with this invention.

With the foregoing general discussion in mind, there is given herewith a detailed example of the practice of this invention. All parts given are by weight.

Example

Reactor charge:

| | Pounds |
|---|---|
| A. {Tetrachlorobutane | 230 |
| {Methanol | 285 |
| Sodium hydroxide (50% aqueous solution) | 235 |

Silicate coating composition:
  "N-Brand Silicate," manufactured by the Philadelphia Quartz Company, a 41° Bé. aqueous solution of sodium silicate having an Na$_2$O:SiO$_2$ ratio of 1:3.22

The apparatus employed comprised a 75 gallon still pot provided with a heating and cooling jacket and surmounted by a reflux column. This column comprises a tower 4" in diameter and 40" in height packed (when in operation) with vertically arranged glass fibers ("Fiberglas," Basic fiber No. 800, manufactured by the Owens-Corning Corporation; total weight of fiber in tower, 3 lb.). The column was provided at the top with a partial condenser arranged to reflux its condensate to the column, and a final condenser arranged to condense and divert as product the vapors passing the partial condenser.

Preliminary to operation, and before loading the tower with the glass fiber, the entire interior surfaces of the still pot, tower and condensers were brush-coated with the silicate coating composition, and air-dried. The glass fiber was then evenly packed into the tower.

The ingredients listed at "A" were charged into the still pot, and the sodium hydroxide was then fed into the still pot at a rate such that the vapors evolved had a velocity of 5 feet per second in the column. The partial condenser was adjusted to provide a reflux ratio of 2.4:1 (reflux: total material removed from the column), under which conditions it is estimated that the column provided a separation equivalent to 10 theoretical plates. During most of the run, the temperature at the top of the column remained steady at 65° C., the discharged distillate comprising an azeotrope of about 50% dichlorobutadiene. Toward the end of the run, heat was supplied to the still pot, and the temperature of the vapors at the top of the column gradually rose to 70° C., at which point the reaction was discontinued. The distillate recovered from the final condenser was mixed with water to effect separation of the dichlorobutadiene therefrom. The yield of dichlorobutadiene was 100 lb., or 69.5% of the theoretical.

The foregoing run was repeated 4 times before it was necessary to shut down for clean-up. The glass fiber was removed from the column, and the polymeric substances clinging to the surfaces of the apparatus were broken up and largely removed by a light scraping. The apparatus was then soaked in water for 24 hours, and the remainder of the deposit removed very easily by scraping. The water-soak was omitted on a portion of the apparatus; the removal of the incrustation was effected fairly readily, but not quite so easily as from the soaked portions of the apparatus.

By way of comparison, using an identical apparatus without silicate coating, the apparatus became choked on the first run. The deposits clung so tightly that it was found cheaper to scrap the apparatus rather than to clean the same.

From the foregoing general discussion and detailed example, it will be apparent that this invention provides an effective means for reducing the polymerization of dichlorobutadiene upon surfaces with which it comes into contact. The deposits which eventually do form upon the surfaces in accordance with this invention may be removed with a minimum expenditure of labor.

What is claimed is:

1. Process which comprises handling dichlorobutadiene in a steel vessel, the surfaces of which in contact with the dichlorobutadiene are coated with sodium silicate, until the surfaces are fouled with polymerization products, soaking the vessel with water to soften the sodium silicate coating, and removing the polymerization products from the fouled surfaces.

2. Process which comprises distilling 2,3-dichlorobutadiene-1,3 through a reflux column, the metallic interior surfaces of which are coated with sodium silicate.

3. Process which comprises distilling 2,3-dichlorobutadiene-1,3 through a steel reflux column, the interior surfaces of which are coated with sodium silicate, continuing the distillation until the column is fouled with polymerization products, softening the sodium silicate by treatment with water, and removing the incrusted polymeric material from the fouled surfaces.

ROBERT T. O'DONNELL.

REFERENCES CITED

The following references are of record in the file of this patent:

UNITED STATES PATENTS

| Number | Name | Date |
| --- | --- | --- |
| 2,403,966 | Browne | July 16, 1946 |

OTHER REFERENCES

Silicate of Soda Cements, Bulletin 241 published 1940 by Philadelphia Quartz Company, 121 S. Third Street, Philadelphia, Pa., page 8. (Copy in Div. 38.)